United States Patent
Abe

(10) Patent No.: US 9,930,242 B2
(45) Date of Patent: Mar. 27, 2018

(54) FOCUS DETECTION APPARATUS AND CONTROL METHOD FOR THE SAME

(71) Applicant: CANON KABUSHIKI KAISHA, Tokyo (JP)

(72) Inventor: Hiroshi Abe, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 29 days.

(21) Appl. No.: 14/945,849

(22) Filed: Nov. 19, 2015

(65) Prior Publication Data

US 2016/0150149 A1     May 26, 2016

(30) Foreign Application Priority Data

Nov. 21, 2014   (JP) .................................. 2014-237020

(51) Int. Cl.
| | |
|---|---|
| *H04N 5/232* | (2006.01) |
| *H04N 5/235* | (2006.01) |
| *H04N 17/00* | (2006.01) |
| *G03B 13/36* | (2006.01) |

(52) U.S. Cl.
CPC ........ *H04N 5/23212* (2013.01); *H04N 5/2356* (2013.01); *H04N 5/23209* (2013.01); *H04N 5/23216* (2013.01); *H04N 17/002* (2013.01); *G03B 13/36* (2013.01)

(58) Field of Classification Search
CPC ........... H04N 5/23209; H04N 5/23212; H04N 5/23216; H04N 5/2356; H04N 17/002; G03B 13/36
See application file for complete search history.

(56) References Cited

U.S. PATENT DOCUMENTS

| | | | |
|---|---|---|---|
| 8,676,050 B2 * | 3/2014 | Shuster .............. | G01M 11/0228 348/187 |
| 9,699,368 B2 * | 7/2017 | Abe .................... | H04N 5/23212 |
| 2008/0199168 A1 * | 8/2008 | Sakaguchi ............. | G03B 13/34 396/91 |
| 2011/0019067 A1 * | 1/2011 | Matsumoto ........ | H04N 5/23212 348/346 |
| 2012/0242890 A1 * | 9/2012 | Nakamoto ......... | H04N 5/23212 348/346 |
| 2013/0088636 A1 * | 4/2013 | Inoue ..................... | G03B 13/36 348/346 |
| 2016/0080631 A1 * | 3/2016 | Huh ........................ | H04N 5/44 348/349 |
| 2016/0150166 A1 | 5/2016 | Hashimoto | |
| 2016/0173758 A1 | 6/2016 | Kai | |

FOREIGN PATENT DOCUMENTS

| | | |
|---|---|---|
| JP | 2005-109621 A | 4/2005 |
| JP | 2005-227639 A | 8/2005 |

* cited by examiner

*Primary Examiner* — Daniel M Pasiewicz
(74) *Attorney, Agent, or Firm* — Cowan, Liebowitz & Latman, P.C.

(57) ABSTRACT

A focus detection apparatus comprises: a focus detection unit configured to detect a focus state; an obtaining unit configured to obtain a correction value to be used in correction of the focus state detected by the focus detection unit; and a storage unit configured to store a correction value. In a case where a difference between the correction value stored in the storage unit and the correction value obtained by the obtaining unit is smaller than a threshold value, the correction value stored in the storage unit is not updated.

21 Claims, 7 Drawing Sheets

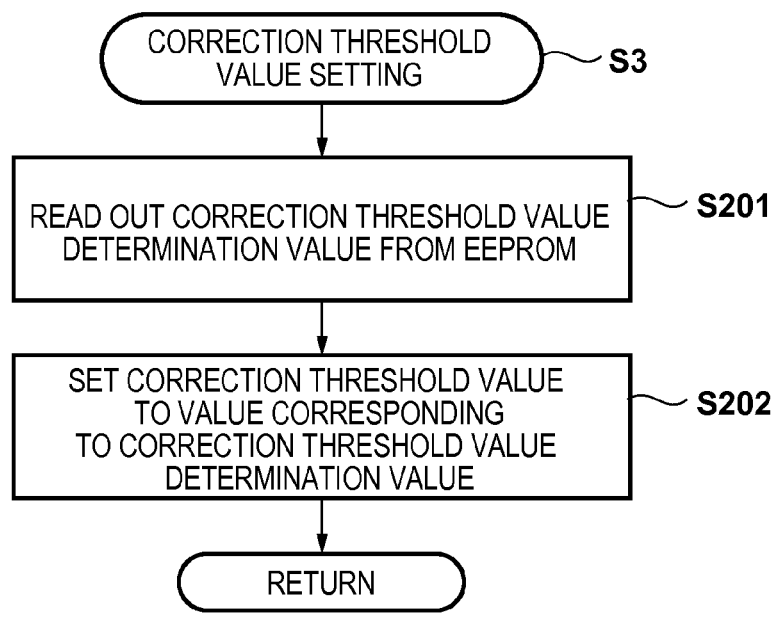

FOCUS DETECTION APPARATUS AND CONTROL METHOD FOR THE SAME

BACKGROUND OF THE INVENTION

Field of the Invention

The present invention relates to a focus detection apparatus and a control method for the same, and in particular relates to a focus detection apparatus capable of performing automatic focus adjustment, and a control method for the same.

Description of the Related Art

Single-lens reflex cameras are often provided with a focus detection system that uses a phase difference detection method to detect the focus state (defocus value) of the imaging optical system based on the phase difference between a pair of images formed by light that passed through the imaging optical system in an interchangeable lens. In this phase difference detection method, there is a risk of not being able to accurately detect the in-focus position due to the influence of the environment or the like at the time of imaging, and due to manufacturing error in single-lens reflex cameras and interchangeable lenses.

In order to solve this problem, Japanese Patent Laid-Open No. 2005-227639 discloses an image capturing apparatus that has a function (AF micro adjustment) for allowing the user to make desired micro adjustments to a correction value for the automatic focus adjustment function (AF). However, the conventional technology disclosed in Japanese Patent Laid-Open No. 2005-227639 has an issue in that the operations of image capturing and checking need to be performed repeatedly in order to check whether or not the result of the user's micro adjustment is correct.

In order to resolve this issue, Japanese Patent Laid-Open No. 2005-109621 discloses an image capturing apparatus that has a function in which the defocus value of the imaging lens is associated with images, and an AF correction value is automatically calculated based on a focus position shift amount associated with an image determined by the user to be in focus.

In Japanese Patent Laid-Open No. 2005-109621, the focus position shift amount is obtained according to the AF bracket step amount and the bracket count, and there is a possibility that when defocus values are detected at various lens positions, there will not be a match with the aforementioned focus position shift amount due to various causes of error. In view of this, in order to obtain a more precise AF correction value, it has been envisioned to detect the defocus value at various lens positions and calculate the AF correction value based on the detected defocus values. However, due to causes of error such as error in the detection of defocus values associated with images and error in image selection, there is a risk of obtaining an erroneous AF correction value, and the focus adjustment precision easily degrading.

SUMMARY OF THE INVENTION

The present invention has been made in consideration of the above situation, and prevents degradation in focus adjustment precision caused by an AF correction value for adjusting a defocus value.

According to the present invention, provided is a focus detection apparatus comprising: a focus detection unit configured to detect a focus state; an obtaining unit configured to obtain a correction value to be used in correction of the focus state detected by the focus detection unit; and a storage unit configured to store a correction value, wherein in a case where a difference between the correction value stored in the storage unit and the correction value obtained by the obtaining unit is smaller than a threshold value, the correction value stored in the storage unit is not updated.

Further, according to the present invention, provided is a control method for a focus detection apparatus, the control method comprising: detecting a focus state; obtaining a correction value to be used in correction of the focus state; and storing a correction value in a storage unit, wherein in a case where a difference between the correction value stored in the storage unit and the correction value that was obtained is smaller than a threshold value, the correction value stored in the storage unit is not updated.

Furthermore, according to the present invention, provided is a computer-readable storage medium storing a program for causing a computer included in an image capturing apparatus to execute the steps of the control method that comprises: detecting a focus state; obtaining a correction value to be used in correction of the focus state; and storing a correction value in a storage unit, wherein in a case where a difference between the correction value stored in the storage unit and the correction value that was obtained is smaller than a threshold value, the correction value stored in the storage unit is not updated.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a flowchart showing correction threshold value setting processing according to a first embodiment;

FIG. 6 is a diagram showing a relationship between a correction mode, a correction threshold value determination value, and a correction threshold value according to the first embodiment.

DESCRIPTION OF THE EMBODIMENTS

Exemplary embodiments of the present invention will be described in detail in accordance with the accompanying drawings. The dimensions, shapes and relative positions of the constituent parts shown in the embodiments should be changed as convenient depending on various conditions and on the structure of the apparatus adapted to the invention, and the invention is not limited to the embodiments described herein.

First Embodiment

Figure 1:
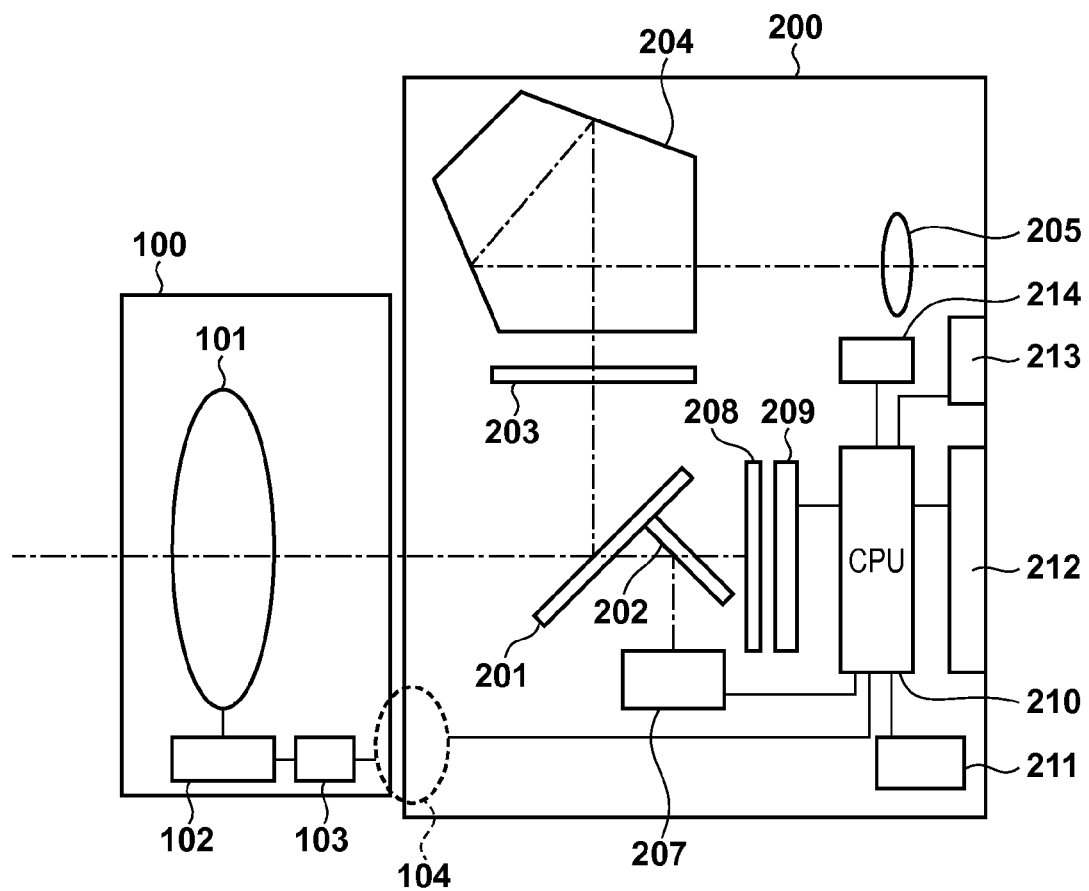
FIG. 1 is a block diagram showing a schematic configuration of an image capturing apparatus according to an embodiment of the present invention.

Hereinafter, a first embodiment of the present invention will be described. FIG. 1 is a block diagram showing the schematic configuration of an image capturing apparatus according to the first embodiment. As shown in FIG. 1, an imaging lens 100 is removably attached to an image capturing apparatus 200 via a lens mounting mechanism of a mount unit (not shown). The mount unit is provided with an electrical contact unit 104. The image capturing apparatus 200 performs communication with the imaging lens 100 via the electrical contact unit 104, and controls a focus lens 101 in the imaging lens 100. Note that although FIG. 1 shows only the focus lens 101 as a lens in the imaging lens 100, various other lenses such as a zoom lens and a fixed lens are normally provided as well.

Light flux from a subject (not shown) is guided to a main mirror 201 in the image capturing apparatus 200 via the focus lens 101 in the imaging lens 100. The main mirror 201 is arranged with an inclination relative to the optical axis in the imaging light path, and can move to a first position (the illustrated position) for guiding light flux from the subject to a viewfinder optical system thereabove, and a second position of being retracted outside the imaging light path. Also, the central portion of the main mirror 201 is a half-mirror, and a portion of the light flux from the subject passes through the half-mirror portion when the main mirror 201 is mirrored-down to the first position. This transmitted light flux is reflected by a sub mirror 202 provided on the rear surface side of the main mirror 201, and is guided to a focus detection unit 207.

Meanwhile, the light flux reflected by the main mirror 201 forms an image on a focus plate 203 arranged at a position that is optically conjugate with an image sensor 209. This light flux is diffused by the focus plate 203, and the light that passes through the focus plate 203 (subject image) is converted into an erected image by a roof pentaprism 204. The erected image is enlarged by an eyepiece 205, and the resulting image can be observed by the user.

Also, when the main mirror 201 is mirrored-up to the second position, the sub mirror 202 is also folded along with the main mirror 201 so as to be retracted outside the imaging light path. Accordingly, the light flux from the imaging lens 100 passes through a focal plane shutter 208, which is a mechanical shutter, and arrives at the image sensor 209. The focal plane shutter 208 limits the amount of light that is incident on the image sensor 209. The image sensor 209 is configured to include, for example, a photoelectric conversion element, such as a CCD sensor or a CMOS sensor, that performs photoelectric conversion on the subject image formed by the imaging lens 100 and outputs the resulting electrical signal.

Also, 210 denotes a camera CPU, which is a controller that controls various types of calculations and various types of operations in the camera. The CPU 210 performs overall control of the image capturing apparatus 200, and controls the operation of various circuits and the like that will be described later. The CPU 210 performs communication with a lens control circuit 103 in the imaging lens 100 via the electrical contact unit 104. In accordance with a control signal from the CPU 210, the lens control circuit 103 controls a lens driving mechanism 102 that performs focus adjustment by driving the focus lens 101 in the optical axis direction. The lens driving mechanism 102 has a stepping motor as a driving source.

Also, an EEPROM 211 is also connected to the CPU 210. The EEPROM 211 stores parameters that need to be adjusted when controlling the image capturing apparatus 200, and camera ID (identification) information, which is unique information for individually identifying the image capturing apparatus 200. It also stores adjustment values for parameters related to imaging, which are adjusted using a reference lens (an imaging lens used during adjustment at the image capturing apparatus factory), for example.

A display unit 212 is an apparatus for displaying image data of images captured by the image sensor 209 and displaying items set by the user, and is generally configured by a color liquid crystal display element.

Furthermore, a counter 214 and an operation detection unit 213 that detects operations performed by the user on the image capturing apparatus 200 are connected to the CPU 210. Specifically, the operation detection unit 213 detects an operation performed on a release button (not shown), a select button, and a button allowing the selection of one image from among images obtained by later-described bracket imaging. The counter 214 is a counter for counting the number of shots when performing bracket imaging. The counter value of the counter 214 is reset by the CPU 210.

Meanwhile, the lens control circuit 103 of the imaging lens 100 is provided with a memory (not shown) that stores property information such as the full-open aperture value and the focal length of the imaging lens 100, and lens ID (identification) information, which is unique information for identifying the imaging lens 100. The memory also stores information received by communication from the CPU 210. Note that the property information and the lens ID information are transmitted to the CPU 210 by initial communication at the time of mounting to the image capturing apparatus 200, and the CPU 210 stores this information in the EEPROM 211.

Figure 2:
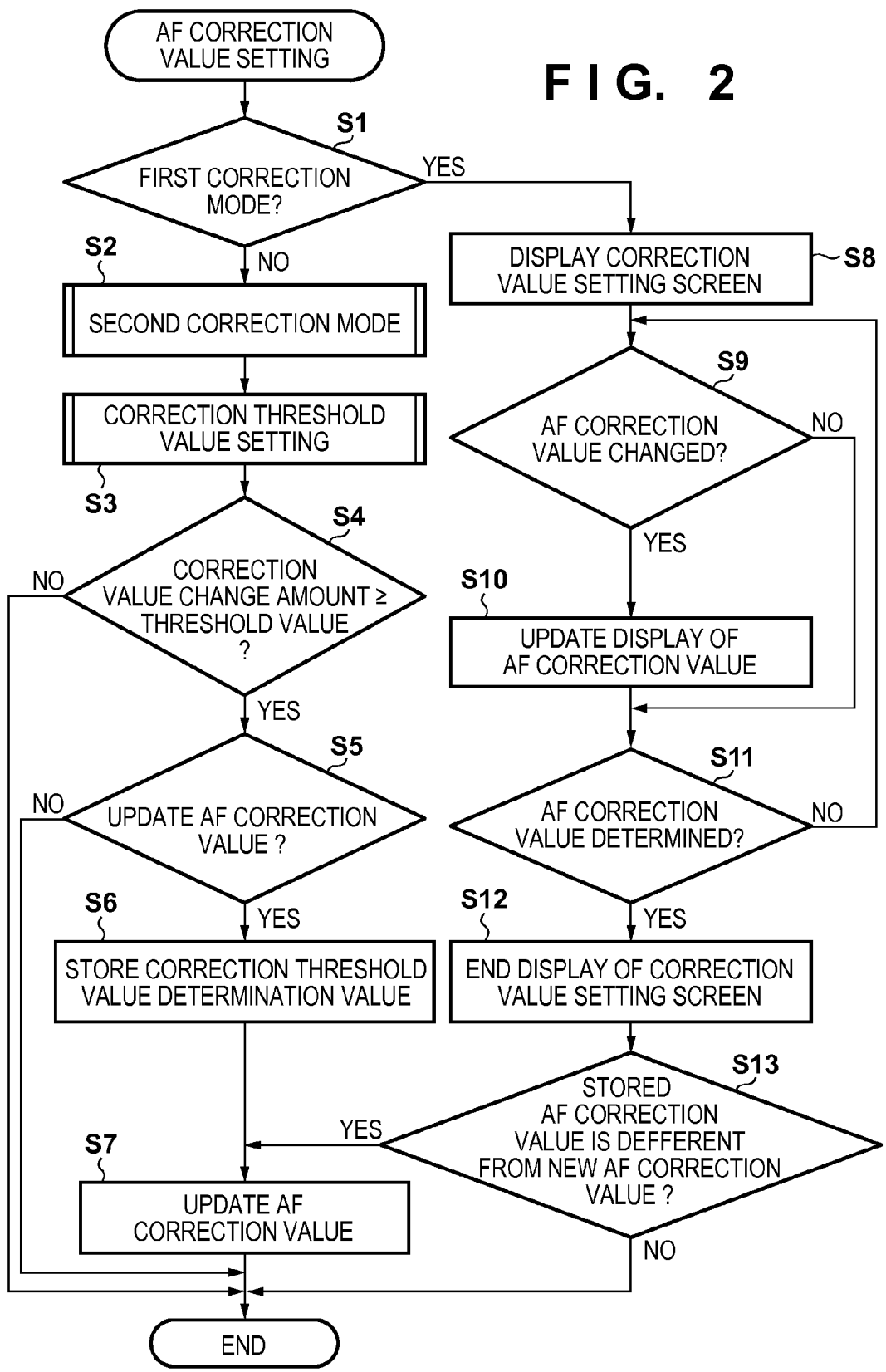
FIG. 2 is a flowchart showing AF correction value setting processing according to an embodiment.

FIG. 2 is a flowchart showing AF correction value setting processing according to the present embodiment. In the present embodiment, it is possible to select either a first correction mode in which the user performs AF micro adjustment for setting a desired AF correction value or a second correction mode in which the AF correction value is obtained using micro adjustment support (MAS). Note that details of AF micro adjustment and the processing using MAS will be described later.

Figure 3:
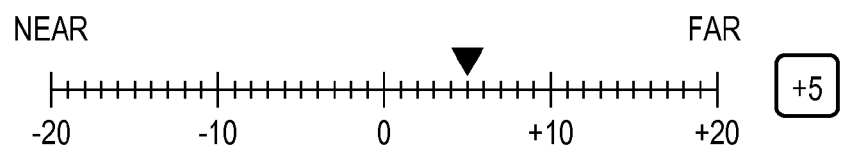
FIG. 3 is a diagram showing an example of a correction value setting screen used in AF micro adjustment according to an embodiment.

First, in step S1, it is determined whether or not the first correction mode was selected. If the first correction mode has been selected, the procedure moves to step S8, and if the first correction mode has not been selected, the procedure moves to step S2. In step S8, a correction value setting screen for performing AF micro adjustment is displayed on the display unit 212. FIG. 3 is a diagram showing an example of the correction value setting screen.

AF micro adjustment is processing in which the user determines, based on a captured image, the amount and direction of shift between the actual in-focus position and the in-focus position that is based on the defocus value detected by the focus detection unit 207, and the user directly sets the AF correction value. As shown in FIG. 3, with AF micro adjustment in the present embodiment, the user can set the AF correction value to a desired value in increments of one tick mark in the range of ±20 tick marks, and the in-focus position that is based on the defocus value can be shifted by an amount corresponding to the AF correction value that was set. The amount of focus correction on the AF correction value for each tick mark is assumed to be $(1/16) \times F\delta$ (F: aperture F of imaging lens, $\delta$: diameter of permissible circle of confusion) in the present embodiment, but there is no limitation to this in the present invention, and this focus correction amount per tick mark can be changed as necessary according to the properties of the imaging lens 100 and the image capturing apparatus 200. In FIG. 3, 0 is the reference position set as a factory default in the image capturing apparatus 200. In the correction value setting screen shown in FIG. 3, the black triangle pointer indicates the AF correction value stored in the EEPROM 211, and the user can change the AF correction value by performing an operation for moving the black triangle pointer along the scale. When the correction value setting screen is displayed, the procedure moves to step S9.

In step S9, it is determined whether or not an operation for changing the AF correction value was performed by the user using the correction value setting screen. If an operation for changing the AF correction value was performed, the procedure moves to step S10, and if an operation for changing the AF correction value has not been performed, the procedure moves to step S11.

In step S10, the display of the correction value setting screen is updated in accordance with the user operation. Here, in the correction value setting screen shown in FIG. 3, the black triangle pointer is displayed at a position that corresponds to the user operation.

In step S11, it is determined whether or not the user determined an AF correction value. Here, it is determined whether or not a "set" button was selected in the correction value setting screen shown in FIG. 3. If the "set" button was not selected, the procedure returns to step S9, and the above processing is repeated. However, if the "set" button was selected, and an AF correction value is determined, the procedure moves to step S12, in which the display of the correction value setting screen is ended, and then the procedure moves to step S13.

In step S13, it is determined whether or not the AF correction value that was stored in the EEPROM 211 when the first correction mode was selected is different from the new AF correction value that was set by the processing from step S9 to step S11. If these two values are different, the procedure moves to step S7, in which the AF correction value is updated, and if the value has not been changed, AF correction value setting processing is ended.

On the other hand, if the first correction mode has not been selected in step S1, an AF correction value is calculated using MAS in the second correction mode in step S2. In the second correction mode that uses MAS, multiple images are captured while driving the position of the focus lens 101 a very small amount, the image determined by the user to be the most in-focus is selected from among the obtained images, and an AF correction value is obtained based on the defocus value of the selected image. Note that details of the processing performed in step S2 will be described later. When the AF correction value has been calculated, the procedure moves to step S3.

In step S3, a correction threshold value is set as an index for determining whether or not the AF correction value calculated in step S2 is to be stored in the EEPROM 211. Note that details of correction threshold value setting processing will be described later. When the correction threshold value has been set, the procedure moves to step S4.

In step S4, it is determined whether a correction value change amount, which is the difference between the AF correction value that was stored in the EEPROM 211 when the second correction mode was selected and the new AF correction value that was calculated in step S2, is greater than or equal to the correction threshold value. If the correction value change amount is greater than or equal to the correction threshold value, the procedure moves to step S5, and if the correction value change amount is less than the correction threshold value, AF correction value setting processing is ended without updating the AF correction value.

In step S5, it is determined whether or not the AF correction value stored in the EEPROM 211 is to be updated to the AF correction value that was calculated in step S2. Here, in the case where the AF correction value is to be updated, such as the case where the setting of the calculated AF correction value was selected by a predetermined operation, the procedure moves to step S6, whereas in the case where the AF correction value is not to be updated, such as the case where AF correction value setting processing was canceled by a predetermined operation, AF correction value setting processing is ended.

In step S6, the correction threshold value determination value is obtained and stored in the EEPROM 211. The correction threshold value determination value is used in step S3 the next time the second correction mode is selected, and therefore the correction threshold value is determined according to the correction threshold value determination value, as will be described later, in step S3. Note that details of correction threshold value determination value will be described later. When the correction threshold value determination value has been stored in the EEPROM 211, the procedure moves to step S7, in which the AF correction value is updated by storing the AF correction value that was obtained by the processing of step S2 or the processing from step S9 to step S13 in the EEPROM 211, and when this updating ends, AF correction value setting processing is ended.

As described above, the AF correction value stored in the EEPROM 211 is used to correct the lens drive amount during AF that is based on the defocus value detected by the focus detection unit 207 (focus detection result), using Equation (1) below.

$$\text{lens drive amount} = \text{defocus value} + \text{adjustment value} + \text{AF correction value} \qquad (1)$$

Note that in Equation (1), the adjustment value indicates data for adjusting the defocus value set at the time of manufacturing.

Figure 4A:
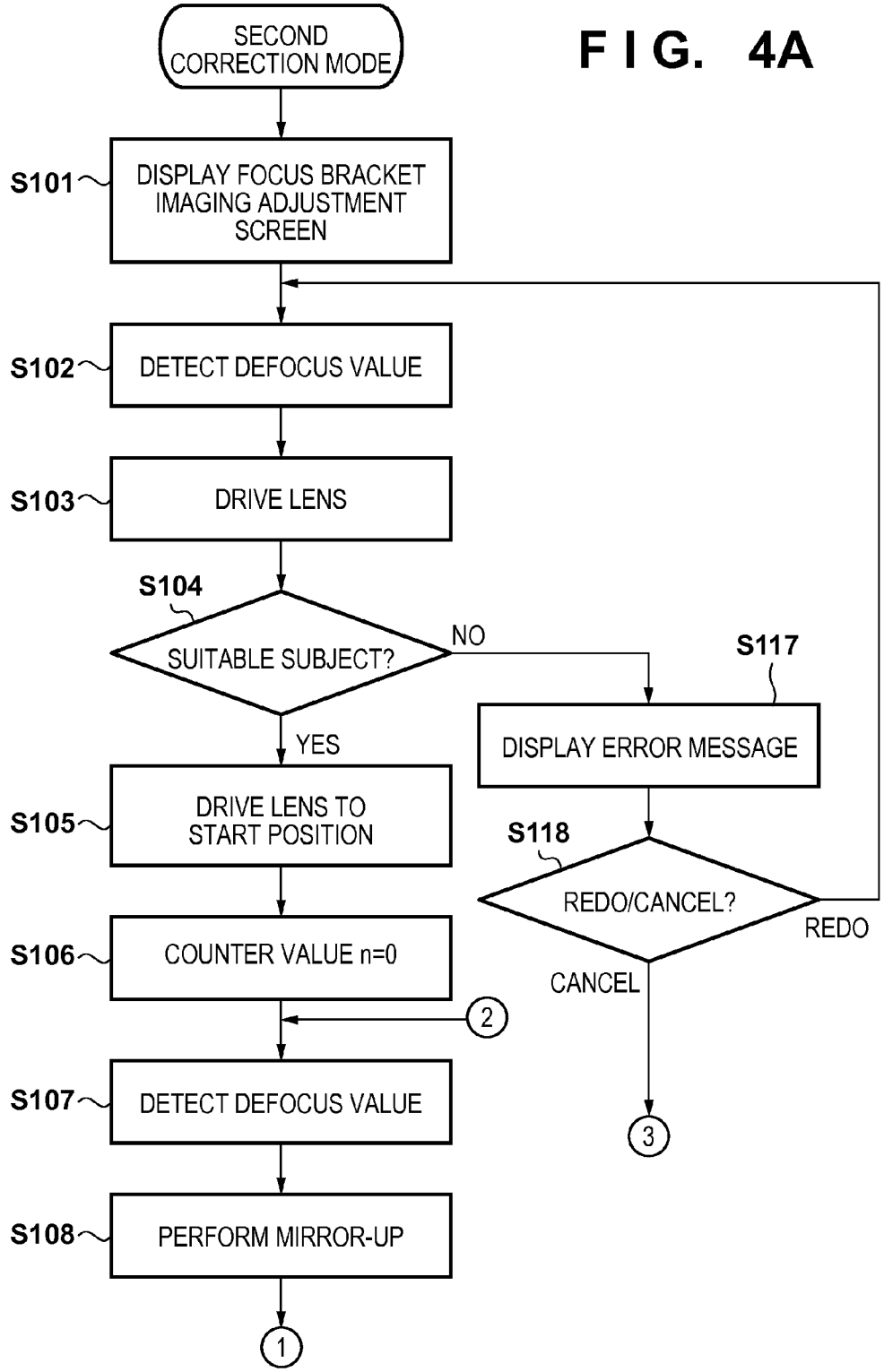
FIGS. 4A and 4B are flowcharts showing correction value setting processing that uses MAS according to an embodiment.
Figure 4B:
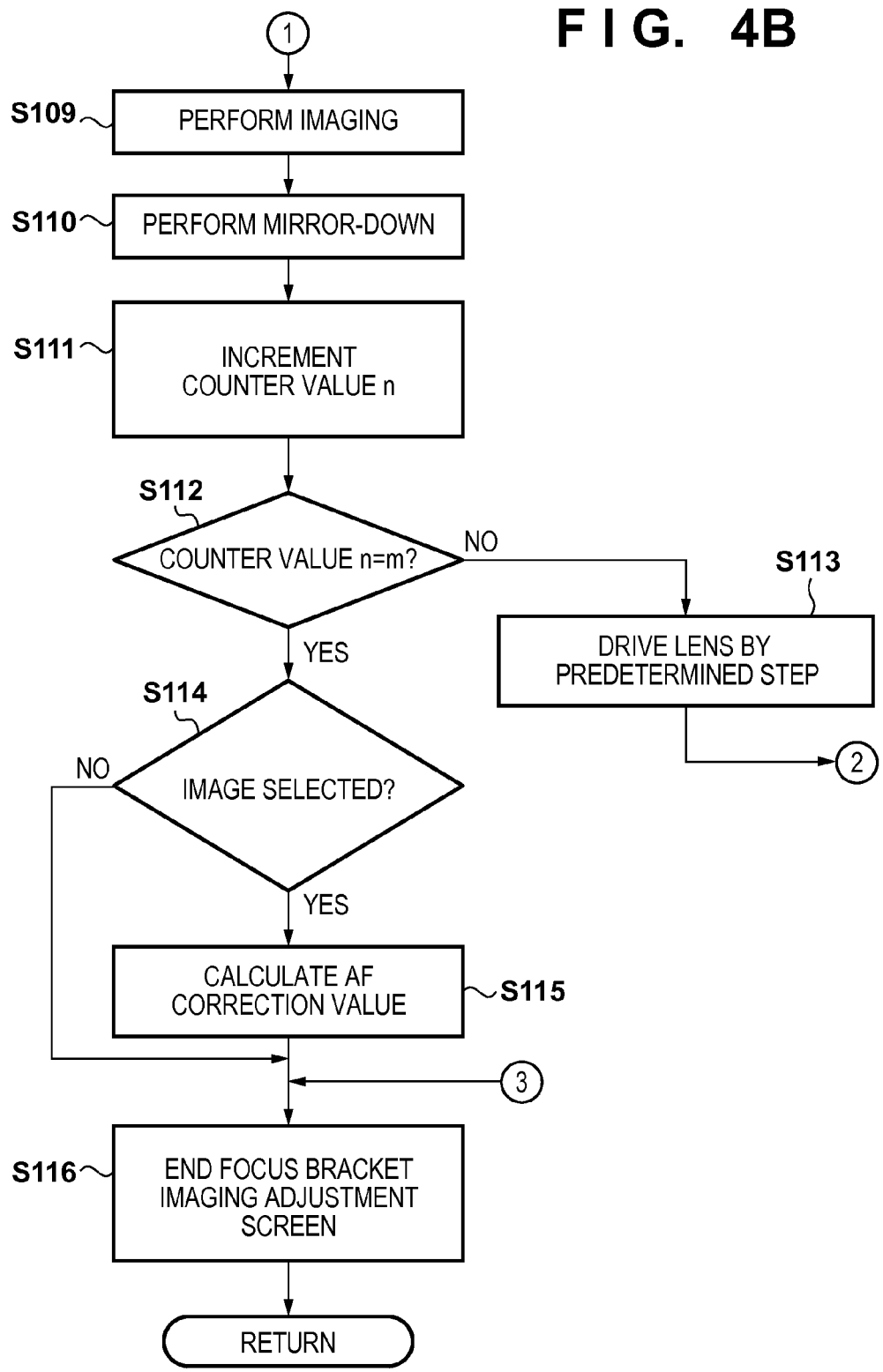

Next, the processing performed in step S2 to set the AF correction value using MAS in the second correction mode will be described with reference to the flowchart in FIGS. 4A and 4B.

First, in step S101, a focus bracket imaging adjustment screen is displayed on the display unit 212. The content displayed here is, for example, an operation instruction for the user. When the adjustment screen has been displayed, the procedure moves to step S102. In step S102, the focus detection unit 207 detects the defocus value for the subject that is to be used in the calculation of the AF correction value of the imaging lens 100. When the detection of the defocus value ends, the procedure moves to step S103, in which the focus lens 101 is driven to a lens position that corresponds to the defocus value that was detected (in-focus position). When the driving of the focus lens 101 ends, the procedure moves to step S104.

In step S104, it is determined whether or not the subject used in the detection of the defocus value in step S102 is a subject that is suited to the calculation of the AF correction value. Here, for example, the focus detection unit 207 calculates an AF reliability evaluation value for the subject based on a signal (the contrast and luminance of the subject) received by a focus detection sensor (not shown) that is provided in the focus detection unit 207. This is performed because the focus detection precision of the focus detection unit 207 decreases if the subject is dark or has low contrast, and therefore the AF reliability evaluation value is given a low value in a case where the focus detection precision may decrease. Then, it is determined whether or not the subject is suitable based on the AF reliability evaluation value that was obtained. If the subject is suitable, the procedure moves to step S105, and if the subject is not suitable, the procedure moves to step S117.

If the subject was not suitable, in step S117, an error message (indicating the fact that an error occurred and the probable cause of the error) is displayed on the display unit 212. When the display is complete, the procedure moves to step S118, in which an instruction to redo or cancel adjustment is received from the user. In the case of redoing adjustment, the procedure returns to step S102, and in the case of canceling adjustment, the procedure moves to step S116 in FIG. 4B.

In step S105, the lens is driven to the focus bracket start position. Letting s be the lens driving step each time imaging is performed, and m be the number of shots, the focus bracket start position is on the close end side at a position $(m-1) \times s/2$ away from the in-focus position that was calculated based on the defocus value. In step S106, a counter value n of the counter 214 is reset. This counter value n is associated with the number of focus bracket shots, and is set to 0 before the start of focus bracket imaging, and thereafter the procedure moves to step S107.

In step S107, the focus detection unit 207 performs defocus value detection. The defocus value detected here is ultimately stored in association with the image that is captured in step S109. When the detection of the defocus value ends, the procedure moves to step S108.

In step S108, prior to imaging in step S109, mirror-up is performed such that the main mirror 201 and the sub mirror 202 move to the second position so as to be retracted outside the imaging light path. When mirror-up ends, the procedure moves to step S109 in FIG. 4B. In step S109, imaging is performed, and the obtained image is stored in association with the defocus value that was detected in step S107. When imaging ends, the procedure moves to step S110, in which mirror-down is performed such that the main mirror 201 and the sub mirror 202 move to the first position in the above-described imaging light path. When mirror-down ends, the procedure moves to step S111.

In step S111, the counter value n that indicates the number of shots is incremented, and then the procedure moves to step S112. In step S112, it is determined whether or not the value of the counter value n has reached the number of shots m. If the counter value n has not reached the number of shots m, the procedure moves to step S113, and if it has reached the number of shots m, the procedure moves to step S114. In step S113, the focus lens 101 is driven toward infinity by the lens driving step s, and when lens driving ends, the procedure moves to step S107. By repeating the processing from step S107 to step S113, m images having different focus states by the lens driving step s are captured consecutively. Note that the above-described example describes the case of first driving the focus lens 101 to the close end side and then performing focus bracket imaging while driving the focus lens toward infinity, but a configuration is possible in which the focus lens is first driven to the infinity side and then focus bracket imaging is performed while driving the focus lens toward the close end.

In step S114, the user selects one best-focused image in which the focus appears to be the most appropriate, from among the m images having different focus states by the lens driving step s.

At this time, the images obtained by the focus bracket imaging are displayed on the display unit 212. The images for display may be displayed one at a time, or may be displayed side-by-side. At this time, the displayed images may be images that have undergone image processing that is different from normal image processing in order to make the focus state easier to perceive. For example, processing for enhancing edges is performed to improve the visual quality when displaying normal captured images, but it is possible to omit edge enhancement processing in the image display performed in step S114. The user operates an operation member (not shown) while checking the images displayed on the display unit 212, selects the image having the best in-focus state, and then determines the selection. If it is difficult to identify which image is in the in-focus state among the images, the user may be allowed to select multiple images. For example, if the user has determined that the in-focus state is between two images that were obtained by focus bracket imaging, it is possible to select two images.

Also, it is not necessarily required to select an image in step S114, and if, for example, the selection of the best-focused image is difficult, and an image has not been selected for a predetermined time, AF correction value setting processing has been canceled by a predetermined operation, or the like, the procedure moves to step S116. On the other hand, if one best-focused image has been selected, the procedure moves to step S115.

In step S115, the AF correction value is calculated based on the defocus value that is associated with the image that was selected by the user in step S114. When the calculation of the AF correction value is complete, the procedure moves to step S116. In step S116, the display of the focus bracket imaging adjustment screen is ended, and the calculation of the correction value in the second correction mode ends.

Note that the above example description is given assuming that MAS is used in the second correction mode, the user chooses one image from a group of images for AF correction value calculation that were obtained by focus bracket imaging, and the AF correction value is calculated based on the defocus value that is associated with the chosen image. However, the present invention is not limited to this, and a configuration is possible in which focus bracket imaging is not performed in order to calculate the AF correction value. For example, a configuration is possible in which multiple images that are associated with defocus values and are not consecutive in time are used as AF correction value calculation images, the user chooses one image from among them, and the AF correction value is calculated based on the defocus value that is associated with the chosen image.

FIG. 5 is a flowchart showing the correction threshold value setting processing that is performed in step S3 in FIG. 2 in the first embodiment, and this processing is performed by the CPU 210. In step S201, the correction threshold value determination value is read out from the EEPROM 211. This correction threshold value determination value is a value that indicates the method used to calculate the AF correction value that was stored in the EEPROM 211 when the second correction mode was selected, and is the value that was stored in step S6.

FIG. 6 is a table showing the relationship between the mode used to calculate the AF correction value that was stored in the EEPROM 211, the correction threshold value determination value, and the correction threshold value in the first embodiment. In the case of correction performed using MAS by focus bracketing, causes of error include error in the detection of the defocus values associated with images, error in the selection of an image by the user, and the like. For this reason, in this range of error, it is possible for an erroneous AF correction value to be obtained using MAS, and for the defocus detection precision to degrade as a result. In order to make it less likely for this degradation in precision to occur, the correction threshold value is set to be approximately the same extent as a value at which the AF correction value is envisioned to vary due to error. Accordingly, it is possible to prevent the degradation of precision in focus adjustment control by the AF correction value calculated by the CPU 210.

In the first embodiment, if the mode used to calculate the AF correction value stored in the EEPROM 211 is factory adjustment, 1 is assigned as the correction threshold value determination value, and if the mode is adjustment in the second correction mode, 2 is assigned as the correction threshold value determination value. Also, if the mode is adjustment in the first correction mode, 3 is assigned as the correction threshold value determination value.

When the reading out of the correction threshold value determination value is complete, the procedure moves to step S202, in which the correction threshold value is set. As shown in FIG. 6, the correction threshold value is stored in the EEPROM 211 in association with the correction threshold value determination value that was read out in step S201.

In the first embodiment, as one example, 3 is set as the correction threshold value that is associated with the correction threshold value determination value 2, which indicates the second correction mode. Also, in the case of factory adjustment, it is thought that the reliability is higher than in the case of adjustment in the second correction mode, and therefore the correction threshold value is set higher than in the second correction mode. Accordingly, it is possible to prevent the AF correction value that was input in factory adjustment from being easily changed in the second correction mode. In the first embodiment, 4 is set as the correction threshold value in the case where the correction threshold value determination value is 1, which is associated with factory adjustment. Also, the adjustment in the first correction mode is thought to be an adjustment mode that has a lower reliability than adjustment in the second correction mode, and therefore the correction threshold value is set lower than in the second correction mode. Accordingly, the AF correction value that was set in the first correction mode can be easily changed by adjustment in the second correction mode. In the first embodiment, 1 is set as the correction threshold value in the case where the correction threshold value determination value is 3, which is associated with the first correction mode.

When the correction threshold value has been set, the procedure moves to step S4 in FIG. 2, and the above-described processing is executed.

Note that although three correction modes each have a correction threshold value determination value and a correction threshold value in the present embodiment, there may be more than three or less than three correction modes. Also, in the case where the first correction mode has been selected, the AF correction value is directly set by the user making a determination, and therefore the AF correction value is updated with the AF correction value that was determined in step S11, without making the determination regarding the updating of the AF correction value with use of the correction threshold value as in the second correction mode.

Second Embodiment

Hereinafter, a second embodiment of the present invention will be described. In the second embodiment, the configuration is similar to the first embodiment with the exception of the processing for setting the correction threshold value determination value and the correction threshold value, and therefore aspects of the configuration other than the processing for setting the correction threshold value determination value and the correction threshold value will not be described.

A reliability evaluation value is used as the correction threshold value determination value in the second embodiment. This reliability evaluation value is calculated based on the contrast and frequency of the image selected by the user, the contrast of the signal detected by the focus detection unit 207 at the time of imaging, or the like, and is a value that indicates the difficulty of image selection by the user and the certainty of defocus detection precision. A high reliability evaluation value indicates that the subject is a subject with which the user can easily select an image, and that the focus detection precision of the focus detection unit 207 is anticipated to be high. Note that the reliability evaluation value may be calculated using, for example, the variation in the defocus value when the defocus value was detected multiple times by the focus detection unit 207, or the designed defocus detection sensitivity and defocus detection precision for the defocus of the imaging lens 100 of the focus detection unit 207.

Figure 7:
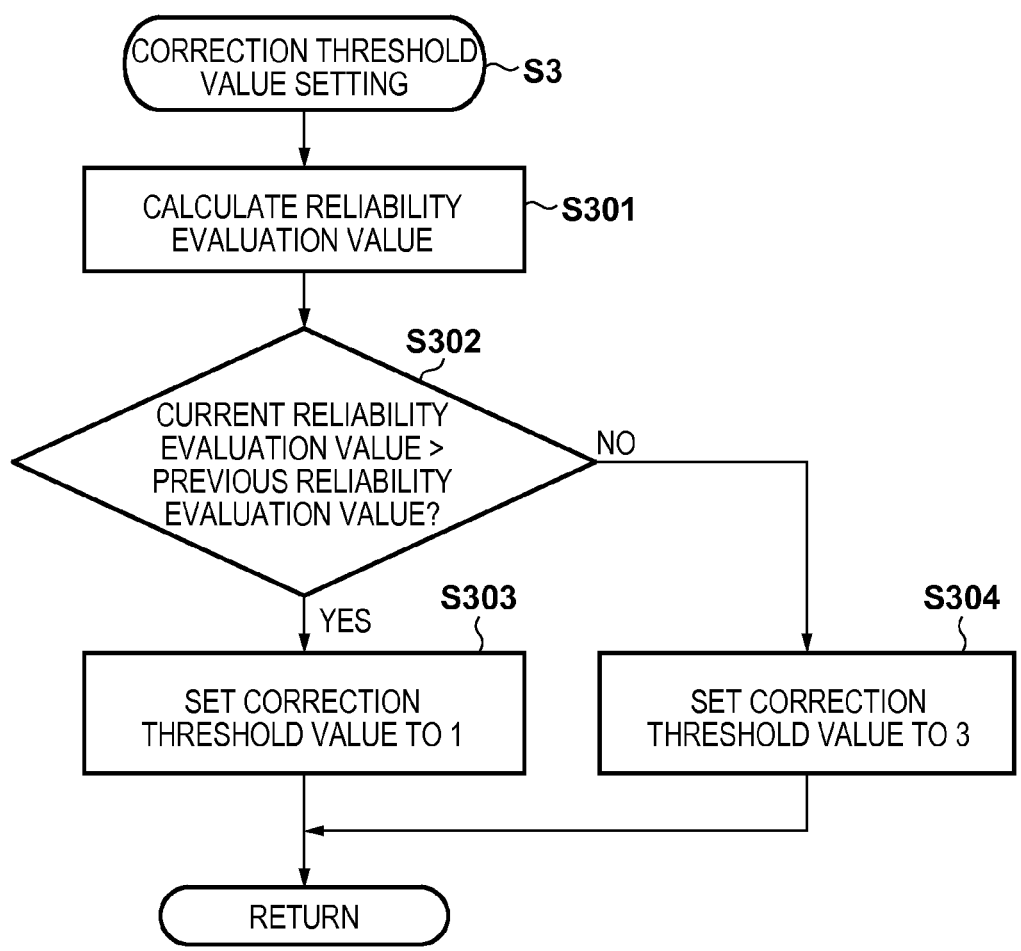
FIG. 7 is a flowchart showing correction threshold value setting processing according to a second embodiment.

FIG. 7 is a flowchart showing the correction threshold value setting processing that is performed in step S3 in FIG. 2 in the second embodiment, and this processing is performed by the CPU 210. In step S301, the reliability evaluation value is calculated, and then the procedure moves to step S302.

In step S302, the reliability evaluation value at the time of obtaining the AF correction value that was stored in the EEPROM 211 when the second correction mode was selected (first reliability evaluation value) is compared with the reliability evaluation value that was obtained in step S301 (second reliability evaluation value). If the result of the comparison is that the second reliability evaluation value is larger, the procedure moves to step S303, and otherwise the procedure moves to step S304.

If the second reliability evaluation value is larger than the first reliability evaluation value, it is currently relatively easier for the user to choose an image compared with the previous adjustment condition, and it is anticipated that there will be little focus detection error, and therefore it is anticipated that the amount of error in AF correction value calculation will be small. For this reason, it is possible to prevent degradation in precision even if the correction threshold value is set to a relatively small value. In view of this, in the second embodiment, the correction threshold value is set to 1 in step S303. Accordingly, it is possible to set the AF correction value more accurately while also preventing degradation in precision.

On the other hand, if the first reliability evaluation value is larger than or equal to the second reliability evaluation value, it is currently relatively more difficult for the user to choose an image compared with the previous adjustment condition, and it is anticipated that there will be a large amount of focus detection error, and therefore it is anticipated that the amount of error in AF correction value calculation will be large. For this reason, it is necessary to prevent degradation in precision by setting the correction threshold value to a comparatively large value. In view of this, in the second embodiment, the correction threshold value is set to 3 in step S304. Accordingly, it is possible to prevent degradation in precision caused by an easy change to the AF correction value that was implemented under good conditions.

Note that the correction threshold value is not limited to being the values described in the first embodiment and the second embodiment, and it can be changed as necessary in accordance with the driving step s of the lens during focus bracketing, and the properties of the imaging lens 100 and the image capturing apparatus 200.

Also, if it is determined in step S5 that the AF correction value is to be updated, the reliability evaluation value that was calculated in step S301 is stored as the correction threshold value determination value in the EEPROM 211 in step S6.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-237020, filed on Nov. 21, 2014 which is hereby incorporated byreference herein in its entirety.

What is claimed is:

1. A focus detection apparatus comprising:
a memory configured to store a correction value; and
at least one processor or one circuitry which function as:
a focus detection unit configured to detect a focus state; and
an obtaining unit configured to obtain a correction value to be used in correction of the focus state detected by the focus detection unit,
wherein n a case where a difference between the correction value stored in the memory and the correction value obtained by the obtaining unit is smaller than a threshold value, the correction value stored in the memory is not updated.

2. The focus detection apparatus according to claim 1, wherein in a case where the difference between the correction value stored in the memory and the correction value obtained by the obtaining unit is greater than or equal to the threshold value, the correction value stored in the memory is updated based on the correction value obtained by the obtaining unit.

3. The focus detection apparatus according to claim 1, wherein the threshold value differs according to a reliability of the correction value stored in the memory.

4. The focus detection apparatus according to claim 1, wherein the obtaining unit obtains the correction value based on a focus state that corresponds to an image selected from among a plurality of images having different focus states.

5. The focus detection apparatus according to claim 1 further comprising:
an image sensor configured to capture an image,
wherein the at least one processor or one circuitry further function as
a control unit configured to control a position of a focus lens,
wherein in a mode of obtaining the correction value using a first mode,
the control unit performs control to move the focus lens to a plurality of different lens positions,
image capturing by the image sensor and focus state detection by the focus detection unit are performed at each lens position among the plurality of lens positions, and
the obtaining unit obtains the correction value based on a focus state that corresponds to an image selected from among the plurality of images.

6. The focus detection apparatus according to claim 5, wherein in the mode of obtaining the correction value by the first mode, the image captured by the image sensor and the focus state detected by the focus detection unit at each of the plurality of lens positions are stored in association with each other, and the obtaining unit calculates the correction value based on a focus state that corresponds to an image selected from among the plurality of images that were stored.

7. The focus detection apparatus according to claim 5, wherein the plurality of lens positions include a lens position at which an in-focus determination is made by the focus detection unit.

8. The focus detection apparatus according to claim 5, wherein the obtaining unit is configured to obtain the correction value using a plurality of modes including the first mode, and
in a case of obtaining the correction value using the first mode, the threshold value is updated in accordance with the mode used to obtain the correction value stored in the memory.

9. The focus detection apparatus according to claim 8, wherein the correction value and predetermined information regarding the mode used to obtain the correction value are stored in the memory in association with each other, and
the threshold value is updated in accordance with the predetermined information stored in association with the correction value stored in the memory.

10. The focus detection apparatus according to claim 8, wherein the plurality of modes include a second mode, and in the second mode, a desired correction value is set as the correction value by the user.

11. The focus detection apparatus according to claim 10, wherein in a case of obtaining the correction value using the second mode, the correction value stored in the memory is updated based on the correction value set by the user, regardless of the difference from the correction value stored in the memory.

12. The focus detection apparatus according to claim 10, wherein the correction value and predetermined information regarding the mode used to obtain the correction value are stored in the memory in association with each other, and
the threshold value associated with the predetermined information that indicates the second mode is smaller than the threshold value associated with the predetermined information that indicates the first mode.

13. The focus detection apparatus according to claim 8, wherein the correction value and predetermined information regarding the mode used to obtain the correction value are stored in the memory in association with each other, and
in a case where the correction value stored in the memory is a correction value that was adjusted at a factory, the predetermined information indicating a third mode is stored in association with the correction value, and
the threshold value associated with the predetermined information that indicates the third mode is larger than a threshold value associated with the predetermined information that indicates the first mode.

14. The focus detection apparatus according to claim 9, wherein the threshold value is stored in the memory in association with the predetermined information.

15. The focus detection apparatus according to claim 5, wherein the correction value obtained using the first mode and an evaluation value indicating a reliability of the correction value are stored in the memory in association with each other.

16. The focus detection apparatus according to claim 15, wherein the threshold value associated with the evaluation value that indicates a first value is smaller than the threshold value associated with the evaluation value that indicates a second value indicating a lower reliability than the first value does.

17. The focus detection apparatus according to claim 1, wherein the at least one processor or one circuitry further function as
a control unit configured to control a position of a focus lens,
wherein in focus adjustment, the control unit performs control to drive the focus lens to a lens position that is based on a result of the focus state detected by the focus detection unit being corrected using the correction value stored in the memory.

18. A control method for a focus detection apparatus, the control method comprising:
detecting a focus state;
obtaining a correction value to be used in correction of the focus state; and
storing a correction value in a memory,
wherein in a case where a difference between the correction value stored in the memory and the correction value that was obtained is smaller than a threshold value, the correction value stored in the memory is not updated.

19. A non-transitory computer-readable storage medium storing a program for causing a computer included in an image capturing apparatus to execute the steps of the control method that comprises:
detecting a focus state;
obtaining a correction value to be used in correction of the focus state; and
storing a correction value in a memory,
wherein in a case where a difference between the correction value stored in the memory and the correction value that was obtained is smaller than a threshold value, the correction value stored in the memory is not updated.

20. The focus detection apparatus according to claim 15, wherein the evaluation value is obtained based on at least a contrast of the image selected, a frequency of the image selected, and a focus detection precision of the focus detection unit.

21. The focus detection apparatus according to claim 10, wherein in a case of obtaining the correction value using the second mode, the correction value stored in the memory is updated based on the correction value set by the user.

* * * * *